United States Patent
Brombach et al.

(10) Patent No.: US 11,239,662 B2
(45) Date of Patent: Feb. 1, 2022

(54) METHOD FOR FEEDING ELECTRICAL POWER INTO AN ELECTRICAL SUPPLY NETWORK

(71) Applicant: Wobben Properties GmbH, Aurich (DE)

(72) Inventors: Johannes Brombach, Berlin (DE); Swantje Amelsberg, Berne (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/257,685

(22) PCT Filed: Jul. 5, 2019

(86) PCT No.: PCT/EP2019/068103
§ 371 (c)(1),
(2) Date: Jan. 4, 2021

(87) PCT Pub. No.: WO2020/008033
PCT Pub. Date: Jan. 9, 2020

(65) Prior Publication Data
US 2021/0296899 A1 Sep. 23, 2021

(30) Foreign Application Priority Data
Jul. 5, 2018 (DE) ............... 10 2018 116 299.5

(51) Int. Cl.
*H02J 3/24* (2006.01)
*H02J 3/38* (2006.01)
*H02P 9/02* (2006.01)

(52) U.S. Cl.
CPC ............. *H02J 3/24* (2013.01); *H02J 3/381* (2013.01); *H02P 9/02* (2013.01); *H02J 2300/28* (2020.01)

(58) Field of Classification Search
CPC ...... H02J 3/24; H02J 3/38; H02J 3/381; H02J 2300/28; H02P 9/02
See application file for complete search history.

(56) References Cited

U.S. PATENT DOCUMENTS 10,794,364 B2 10/2020 Brombach
2011/0204635 A1 8/2011 Miller

FOREIGN PATENT DOCUMENTS

WO 2017/129749 A1 8/2017
WO 2017/220994 A1 12/2017

OTHER PUBLICATIONS

González-González et al., "Condition monitoring of wind turbine pitch controller: A maintenance approach", *Measurement* 123, Mar. 27, 2018, pp. 80-93.

*Primary Examiner* — Robert L Deberadinis
(74) *Attorney, Agent, or Firm* — Seed IP Law Group LLP (57) ABSTRACT

A method for feeding electrical power into an electrical supply network by means of at least one wind power installation having a power control and a generator, comprising the steps of: creating an electrical power gradient for an electrical power to be generated by the wind power installation wherein the power gradient at least: is limited by means of a stabilization operator or is created by means of a prediction operator in such a way that the electrical power gradient is unequal to a predicted wind power gradient, adjusting the created electrical power gradient in the power control of the wind power installation, generating an electrical power by means of the wind power installation depending on the created electrical power gradient for a feed-in time period with a feed-in time.

17 Claims, 6 Drawing Sheets

METHOD FOR FEEDING ELECTRICAL POWER INTO AN ELECTRICAL SUPPLY NETWORK

BACKGROUND

Technical Field

The present invention relates to a method for feeding electrical power into an electrical supply network. The present invention further relates to a wind power installation and a wind farm which are configured in each case to carry out a method of this type.

Description of the Related Art

Wind power installations normally generate electrical power depending on a prevailing wind and feed this power into an electrical supply network. This means, in particular, that the electrical power fed in by a wind power installation correlates with the prevailing wind conditions.

However, during an operation of the wind power installation, the prevailing wind conditions can suddenly change, for example due to an occurrence of a wind gust or the development of a storm.

In such cases, the wind power installation then suddenly generates more electrical power and then also feed this accordingly into the electrical supply network.

In the event of wind gusts or storms, wind power installations therefore have particularly steep power gradients which they pass on directly to the electrical supply network.

These steep power gradients can then cause network perturbation in the electrical supply network or can even result in a network failure in small (isolated) networks.

The German Patent and Trademark Office has identified the following prior art in the priority application for the present application: US 2011/0204635 A1.

BRIEF SUMMARY

As described herein even in the event of sudden changes in the prevailing wind conditions, a wind power installation is enabled to be operated on the electrical supply network in such a way that no or only minor network perturbation occurs.

A method is thus proposed for feeding electrical power into an electrical supply network.

The method for feeding electrical power into an electrical supply network by means of at least one wind power installation having a power control and a generator thus comprises the steps of: creating an electrical power gradient for an electrical power to be generated by the wind power installation, wherein the power gradient at least is limited by means of a stabilization operator or is created by means of a prediction operator in such a way that the electrical power gradient is unequal to a predicted wind power gradient, adjusting the created electrical power gradient in the power control of the wind power installation and generating an electrical power by means of the wind power installation depending on the created electrical power gradient for a feed-in period with a feed-in time.

It is therefore proposed, in particular, to limit the power gradient of a wind power installation by means of a stabilization operator or a prediction operator.

For this purpose, the wind power installation has at least one power control which is configured to adjust, in particular to limit, the electrical power generated by the wind power installation and output to the electrical supply network, in particular by means of an adjustable or predefinable operator or parameter.

For this purpose, the power control can have, for example, a gradient-limiting module (circuit) and can be disposed in a control unit (controller) which is configured to adjust the output power of the wind power installation, in particular by means of a full-scale converter.

The power control is further configured to adjust a power gradient depending on a stabilization parameter or a prediction parameter.

A stabilization operator is to be understood to mean, in particular, an operator which can be adjusted in the power control and which is configured to stabilize the electrical power output by the wind power installation, in particular over time. The stabilization operator is, for example, an adjustable parameter which is multiplied by a power setpoint for a full-scale converter, wherein the parameter can assume values between 0 and 1. In such a case, for example, the full-scale converter control would determine a power gradient for the full-scale converter depending on a wind gust and this would be multiplied by a value between 0 and 1. As a result, the full-scale converter would have a smaller power gradient than it would actually have depending on the wind gust. A gradient limitation with power limitation is therefore preferably proposed which is preferably combined with a reserve power and utilization of the mass inertia of the rotor, in particular to stabilize the feed-in of the wind power installation. The stabilization operator is preferably chosen in such a way that the stabilization operator stabilizes or equalizes the electrical power generated by the wind power installation and fed into the electrical supply network.

A prediction operator is further to be understood to mean, in particular, an operator which can be adjusted in the power control and which is configured to control the electrical power output by the wind power installation, in particular over time, in such a way that an upcoming wind change is taken into account. The wind power installation or the wind farm having the wind power installation has, for example, a LIDAR system which carries out a remote measurement by means of laser beams. The LIDAR system then sees, for example, a wind gust arriving. The prediction operator is hereupon adjusted in such a way that the wind power installation increases its power even before the wind change occurs, or increases its electrical power output to the electrical supply network. The wind power installation then generates, for example, an electrical power which is greater than an electrical power which is obtainable from the prevailing wind. This power deficit can then be equalized with the aid of the mass inertia of the rotor or the rotor-generator system. However, instead of the LIDAR system, a different upstream wind determination system can also be used, for example a wind mast or a different wind power installation.

In one preferred embodiment, the prediction operator is similarly adjusted in such a way that the prediction operator stabilizes or equalizes the electrical power generated by the wind power installation and fed into the electrical supply network.

The prediction operator therefore has, in particular, the same technical effect as the stabilization operator, i.e., to limit the electrical power output by the wind power installation over time or to stabilize the power output of the wind power installation.

It is advantageous here if the wind power installation has no steep power gradients and the wind power installation can therefore be operated particularly sparingly on the electrical supply network. This is particularly advantageous in the domain of the small or weak electrical supply networks, since substantial power fluctuations here can have a particularly substantial negative impact on the stability of the electrical supply network.

The method furthermore preferably comprises the step of: predicting at least one wind power gradient of a future prevailing wind in a rotor field of the wind power installation for a prediction time period with a prediction time depending on at least one monitored wind parameter.

It is therefore further proposed that a wind power gradient is predicted, i.e., a change in the wind over time. A wind power gradient of this type can be determined, for example, depending on the wind speed. The wind speed is, for example, monitored continuously for this purpose and is evaluated by means of an analysis which takes account of an average wind speed, particularly depending on whether a wind gust or a sudden change in wind conditions occurs.

The wind power gradient is preferably determined for a rotor field of the wind power installation and is predicted there, in particular for a prediction time period depending on at least one monitored wind parameter. It is therefore proposed to focus the prediction in a targeted manner on the yield of the individual wind power installation or the wind farm.

A wind strength or an air pressure, for example, is monitored on the wind power installation. A power value for a rotor field of the wind power installation for a first time period is determined therefrom. The procedure is then repeated for a second time. From these two values determined in this way, a wind power gradient is then determined for a time period depending on which the prediction operator is adjusted, particularly in order to equalize the power output of the wind power installation. Alternatively or additionally, the wind power gradient determined in this way can be compared with an average wind power gradient in order to adjust the prediction operator.

In one preferred embodiment, the wind parameter, for example the wind speed, is further repeatedly monitored or continuously measured.

The wind speed, for example, is continuously monitored and a wind power gradient, i.e., a change in the wind speed over time, is determined therefrom for a rolling time window of, for example, 50 seconds, wherein this wind power gradient is extrapolated into the future in order to predict a further wind power gradient. It is detected, for example, that the wind speed increases continuously by 0.1 m/s per minute. From this value, it is then predicted that the wind speed will similarly increase in each case by 0.1 m/s per minute for the next minute. Depending on this prediction, the prediction operator is then chosen in such a way that the electrical power output by the wind power installation to the electrical supply network is limited over time in such a way that the feed-in of the wind power installation does not result in network faults or substantial power fluctuations in the electrical supply network.

In one particularly preferred embodiment, the wind power gradient predicted in this way is used to create a prediction operator depending on which a or the power gradient is adjusted.

It is therefore proposed, in particular, that the prediction operator is adjusted depending on a wind power gradient.

The prediction operator is therefore, in particular, a parameter adjustment which takes account of future wind conditions and thus affects the power output of the wind power installation in such a way that said wind power installation is stabilized or that the feed-in of the wind power installation does not result in network faults or substantial power fluctuations in the electrical supply network.

Alternatively or additionally, it is proposed in this respect that a prediction operator is determined from the current wind conditions, for example from the ratio of average to maximum wind speed, particularly in the form of a gradient which preferably indicates a gusting wind.

Conversely, the stabilization operator is geared, in particular, toward ensuring that the feed-in of the wind power installation does not result in network faults or substantial power fluctuations in the electrical supply network, without taking account of future wind conditions.

For this purpose, the stabilization operator preferably comprises a stabilization constant which is less than 1, in particular such that the electrical power gradient is smaller than the wind power gradient.

It is therefore proposed, in particular, that the stabilization operator is chosen in such a way that the electrical power gradient of the wind power installation is smaller than the wind power gradient.

The wind power changes, for example, by 0.5 MW per minute and the electrical power gradient is 0.4 MW per minute. In such a case, due to the stabilization operator, the adjusted electrical power gradient is smaller than the power gradient which would be possible on the basis of the wind.

The stabilization operator is therefore adjusted depending on a predefinable value which is less than 1, i.e., for example, 0.8.

The stabilization operator is therefore used, in particular, to stabilize the feed-in of the electrical power of the wind power installation.

For this purpose, it is additionally and/or alternatively proposed to use a fixed gradient with which it is ensured, preferably through the variation of the ramp time, that the gradient of the feed-in of the wind power installation remains below a specific value or predefined limit value. Additionally and/or alternatively, a stabilization of the wind gradient is further proposed. The gradient of the wind, in particular, is limited here by a factor in such a way that the resulting gradient has a smaller but different steepness.

The stabilization operator preferably comprises a stabilization constant which is between 0.4 and 0.6, preferably 0.5, wherein the electrical power gradient is smaller than the wind power gradient.

It is therefore proposed, in particular, that the stabilization constant is chosen in such a way that the electrical power gradient essentially corresponds to half of the wind power gradient as a result.

It has in fact been recognized that a stabilization constant of this type results in a particularly sparing behavior of the wind power installation on the electrical supply network.

Additionally or alternatively, the stabilization operator preferably comprises a power limit value for a maximum electrical power of the wind power installation which is less than a maximum wind power which has been predicted by means of the at least one monitored wind parameter.

Is therefore further proposed to take account of the absolute power of the wind power installation also, i.e., whereby, in addition, the stabilization operator preferably also has a limitation of the maximum electrical power.

The stabilization operator is chosen, for example, in such a way that it takes account of the maximum power of the wind power installation. This is done, for example, by means of a limit value. If, for example, the wind power installation generates 1.8 MW and has a maximum electrical power of the wind power installation of 2 MW, the stabilization operator would be chosen in such a way that the power gradient does not cause the power that is to be generated to exceed the maximum electrical power of the wind power installation.

Additionally or alternatively, the stabilization operator preferably comprises a rotational speed limit value of a maximum permissible rotational speed change of the generator and/or a maximum permissible rotational speed of the generator.

It is therefore particularly preferably proposed that the stabilization operator is further chosen in such a way that it takes account of the mechanical characteristics of the generator. A maximum permissible rotational speed change of the generator and/or a maximum permissible rotational speed of the generator is/are preferably used for this purpose.

In one particularly preferred embodiment, the mechanical characteristics of the generator, in particular the rotational speed limit value and/or the maximum permissible rotational speed change of the generator, are taken into account only in full-load operation of the wind power installation, in particular not in partial-load operation of the wind power installation.

It is therefore also proposed to take account of the mechanical characteristics of the generator only in specific operating ranges, i.e., in full-load operation.

The stabilization operator is therefore provided, in particular, to stabilize the power output of the wind power installation at least temporarily, in particular in such a way that the feed-in of the wind power installation does not result in network faults or substantial power fluctuations in the electrical supply network.

This effect can similarly be achieved with the aid of a predicted wind power which is implemented, for example, by means of a prediction operator in the power control of the wind power installation in such a way that the feed-in of the wind power installation does not result in network faults or substantial power fluctuations in the electrical supply network.

For this purpose, the prediction operator preferably comprises a prediction constant which is less than 1, in particular such that the electrical power gradient is smaller than the wind power gradient.

It is therefore proposed, in particular, that the prediction operator is chosen in such a way that the electrical power gradient of the wind power installation is smaller than the wind power gradient.

The wind power changes, for example, by 1 MW per minute and the electrical power gradient is 0.7 MW per minute. The prediction constant then has a value of 0.7.

The prediction constant is preferably adjusted depending on a predefinable value, wherein said value is preferably defined depending on a prediction. It is therefore proposed, in particular, not to determine the constant randomly, but in a targeted manner depending on a wind prediction, for example through the use of a LIDAR system which determines the future wind conditions, wherein a prediction constant can be selected in a targeted manner through this quantification of the wind conditions in such a way that the feed-in of the wind power installation does not result in network faults or substantial power fluctuations in the electrical supply network.

Additionally or alternatively, the prediction operator preferably comprises a prediction constant which is between 0.4 and 0.6, preferably 0.5, in particular such that the electrical power gradient is smaller than the wind power gradient.

Additionally or alternatively, the prediction operator preferably comprises a prediction constant which is chosen in such a way that the electrical power gradient generates an electrical wind power installation activity beginning with the start of the feed-in time period with the start feed-in time and ending with the end of the feed-in time period with the end feed-in time which essentially corresponds in terms of amount to a wind activity beginning with the start of the prediction time period with the start prediction time and ending with the end of the feed-in time period with the end feed-in time.

The prediction constant is therefore chosen accordingly in such a way that the electrical activity of the wind power installation corresponds essentially to the wind activity, but only time-shifted.

If, for example, the power gradient of the wind power installation was flatter than the wind power gradient, the wind power installation would initially generate more electrical energy than is obtainable from the prevailing wind. The power deficit can then be equalized, for example, through withdrawal of the inertia from the rotor-generator train of the wind power installation or from an additional electrical storage device.

It is therefore proposed to choose the gradient in such a way that the feed-in of the wind power installation starts before the wind gust occurs and preferably, as a result, the electrical activity of the wind power installation at the end of the method corresponds essentially to the wind activity made available by the wind gust.

An analysis of the prevailing wind is preferably carried out for this purpose, particularly in order to identify a deviation from the average wind speed which indicates or signals the occurrence of a wind gust and therefore the wind gust itself.

It is therefore preferably proposed to monitor and analyze the wind speed continuously and to determine an additional wind activity therefrom.

Additionally or alternatively, the prediction operator preferably comprises at least one power limit value for a maximum electrical power of the wind power installation which is less than a maximum wind power which has been predicted by means of the at least one monitored wind parameter.

It is therefore preferably proposed that the prediction operator takes account of the maximum electrical power of the wind power installation.

Is therefore also proposed, in particular, to limit the absolute power of the wind power installation also, i.e., whereby the prediction operator preferably additionally has a limitation of the maximum electrical power.

The prediction operator is chosen, for example, in such a way that it takes account of the maximum power of the wind power installation. This is done, for example, by means of a limit value. If, for example, the wind power installation generates 1.2 MW and has a maximum electrical power of the wind power installation of 1.5 MW, the prediction operator would be chosen in such a way that the power gradient does not cause the power that is to be generated to exceed the maximum electrical power of the wind power installation.

Additionally or alternatively, the prediction operator preferably comprises a rotational speed limit value of a maximum permissible rotational speed change of the generator and/or a maximum permissible rotational speed of the generator.

It is therefore particularly preferably proposed that the prediction operator is further chosen in such a way that it takes account of the mechanical characteristics of the generator. A maximum permissible rotational speed change of the generator and/or a maximum permissible rotational speed of the generator is/are preferably used for this purpose.

In one particularly preferred embodiment, the mechanical characteristics of the generator are taken into account only in full-load operation, in particular not in partial-load operation of the wind power installation.

The prediction operator is preferably chosen in such a way that the feed-in time period with the feed-in time begins with a time shift before the prediction time period with the prediction time.

It is therefore proposed, in particular, to increase the feed-in even before the wind gust arrives. This must be taken into account accordingly in the choice of the prediction operator. It is predicted, for example, that the wind gust or a sustained wind level increase will occur at the wind power installation in 1 minute. In response, the wind power installation increases the generation of electrical energy even before the occurrence of this event, in particular beyond a maximum value which is obtainable from the prevailing wind. Storage devices, e.g., electrical storage devices, within the wind power installation, for example, can be provided for the power increase or the equalization of the power deficit, or mechanical inertia can be extracted from the rotor-generator system in order to equalize the electrical power deficit.

It is therefore proposed, in particular, to undertake a power increase even before the wind conditions change, particularly in order to stabilize the feed-in.

In one particularly preferred embodiment, the time shift is predefinable within a predetermined interval. This means that the time shift can be predefined as a boundary condition within specific limits. It may be appropriate, for example, to allow the time shift to be no greater than 5 seconds at certain locations and no greater than 30 seconds at other locations.

The prediction operator and/or the stabilization operator is/are preferably chosen in such a way that the feed-in time period with the feed-in time ends with a time shift after the prediction time period with the prediction time.

It is therefore proposed, in particular, that the method begins, for example, before the occurrence of a wind gust and ends only after the wind gust has died down.

The method therefore has two edges, a leading edge, that of the power increase, and a trailing edge, that of the power reduction. In both cases, it is now proposed to choose the power gradient of the generated electrical power of the wind power installation as flatter than the wind power gradient is or has been predicted on the basis of the prevailing wind conditions. The feed-in of the wind power installation is stabilized through the choice of flatter gradients. As a result, in particular, the wind power installation can be operated more sparingly on the electrical supply network. It is therefore proposed, in particular, to generate less electrical power for a certain time period than would be possible on the basis of the prevailing wind.

In one particularly preferred embodiment, the operators are chosen in such a way that the electrical activity of the wind power installation corresponds to the activity of the prevailing wind, and therefore the wind power installation has essentially the same energy state before and after the method. This is particularly advantageous in enabling network-sparing operation during temporarily occurring changes in wind conditions, such as, e.g., wind gusts.

Furthermore, in one particularly preferred embodiment, the time shift is predefinable within a predetermined interval, for example within an interval between 5 and 30 seconds.

The prediction operator and/or the stabilization operator is/are preferably chosen in such a way that the generated electrical power is less than a maximum wind power which has been predicted by means of the at least one monitored wind parameter.

It is therefore proposed, in particular, that the prediction operator and/or the stabilization operator is/are chosen in such a way that the electrical power changes more slowly than the wind power and preferably results in a maximum electrical power which is less than a maximum wind power. The wind power installation thus generates, at least temporarily, less electrical power than is theoretically obtainable from the wind. The generation of electrical power is therefore deliberately abandoned in order to ease the load on the electrical supply network or to avoid loading the electrical network any further or any longer than is necessary. It is therefore proposed, in particular, to restrict the operation of the wind power installation temporarily in the event of substantial wind fluctuations in order to ease the load on the electrical supply network.

The prediction time is preferably unequal to the feed-in time, in particular wherein the prediction time is shorter than the feed-in time, preferably wherein the prediction time is shorter than half of the feed-in time.

It is therefore proposed, in particular, that the feed-in method lasts significantly longer than the prediction method. This preferably has the result, in particular, that the feed-in method lasts significantly longer than the change in the prevailing wind conditions.

The feed-in time period with the feed-in time preferably begins before the prediction time period, in particular wherein electrical power is generated before the prediction time period with a prediction time depending on the created electrical power gradient for a feed-in time period with a feed-in time.

It is thus proposed that the wind power installation provides an initial input, in particular by withdrawing mechanical inertia from the rotor-generator train of the wind power installation. The withdrawal can then be repeated at the end of the method.

It is particularly advantageous here that the feed-in of the wind power installation is stabilized by means of the method without imposing a greater load on the electrical supply network.

The generated electrical power is preferably generated by means of a wind power moving through the rotor field and a stored, in particular mechanical, power, wherein the mechanical power is extracted mechanically from the wind power installation by changing a rotational speed of a generator.

The method is therefore preferably carried out using the mechanical inertia of the rotor-generator system of the wind power installation.

In one particularly preferred embodiment of the method, it is thus proposed to provide electrical power by extracting inertia from the rotor-generator system in order to stabilize the feed-in of the wind power installation.

The prediction of the at least one wind power gradient is preferably performed using a LIDAR system which is preferably aligned in such a way that it is aimed at a sector whose median line lies essentially perpendicular on the rotor field of the wind power installation or on a normal of the prevailing wind.

It is thus proposed, in particular, that a precontrol of the electrical power is performed with the aid of a LIDAR system. For this purpose, the LIDAR system is aligned, in particular, in such a way that it can predetermine the yield or the potential yield of the wind power installation or wind farm as precisely as possible.

The electrical power gradient is preferably limited by means of a precontrol of the power control and/or a gradient limiter.

The power control thus has a limitation element which is freely parameterizable and can be adjusted by the operator of the wind power installation, for example depending on the location of the wind power installation. Alternatively, the limitation is performed by means of a precontrol which can be implemented, for example, with the aid of a LIDAR system.

The method is preferably carried out by utilizing a mass inertia of the generator.

It is thus proposed, in particular, to use the energy of the rotor-generator system to provide required electrical power, in particular by extracting the mass inertia of the generator.

In one particularly preferred embodiment, a ring generator or a generator which is configured to produce the highest possible mass inertia is used for this purpose.

A method for generating an electrical current is further proposed, said method comprising a method described above or below, wherein an electrical power gradient is repeatedly adjusted, wherein the repeating power gradient has a sign which is the opposite of the sign of the electrical power gradient and wherein the power gradients are essentially equal or unequal in terms of amount.

It is thus proposed to adjust the power gradient, in particular constantly, i.e., to use the method not only to increase power, but also to decrease power, and vice versa.

If, for example, a wind gust therefore occurs, it is proposed to use the method described above or below for gradient limitation not only when a wind gust develops, but also when the wind gust dies down.

A wind power installation having a power control is further proposed, said power control being configured to carry out one of the above methods.

A wind farm having a wind farm control is further proposed, said wind farm control being configured to carry out one of the above methods.

It is proposed here, in particular, that the wind farm has a wind farm control unit (controller) which is configured to control the individual wind power installations of the wind farm, wherein the wind farm control unit comprises the power control.

The wind farm control unit is thus configured to limit the power gradients of the individual wind power installations in such a way that the output power of the wind farm is limited. For this purpose, the same power gradient can be predefined, for example, for each wind power installation, or an individual power gradient which behaves in relation to the rated power of the installation can be predefined for each wind power installation. The latter option is particularly advantageous in relation to mixed farms, i.e., farms which have a multiplicity of wind power installations which are of different types and have different rated powers.

BRIEF DESCRIPTION OF THE SEVERAL VIEWS OF THE DRAWINGS

The present invention will now be explained in detail below by way of example on the basis of example embodiments with reference to the accompanying figures.

DETAILED DESCRIPTION

Figure 1:
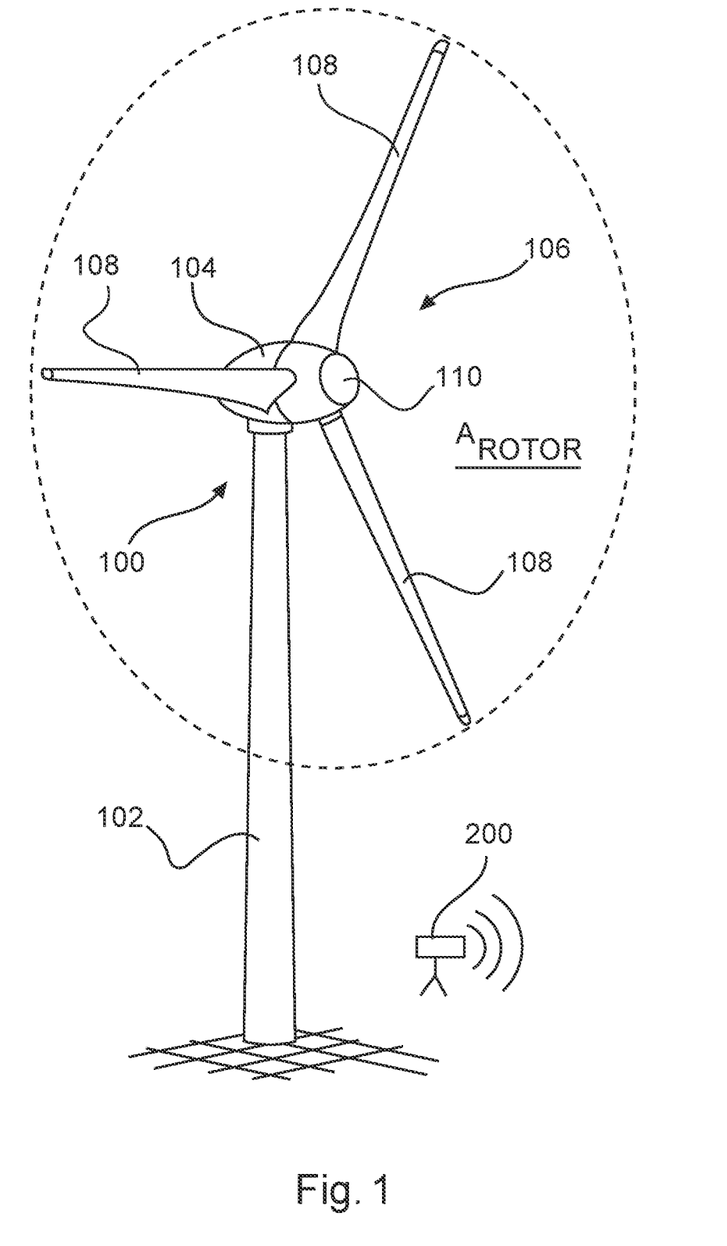
FIG. 1 shows schematically a perspective view of a wind power installation.

FIG. 1 shows a wind power installation 100, in particular of a wind farm, with a tower 102 and a nacelle 104. A rotor 106 with three rotor blades 108 and a spinner 110 is arranged on the nacelle 104. The rotor 106 moves through a rotor field $A_{Rotor}$ and is set in rotational motion by the wind, as a result of which a generator in the nacelle 104 is driven. The generator thereby produces an electrical current which is preferably modulated by means of an inverter and is fed into an electrical supply network. The inverter itself is controlled by means of a power control which is configured to carry out a method described above or below.

A LIDAR system 200 is provided in order to carry out the method described above or below by means of the wind power installation 100.

Figure 2:
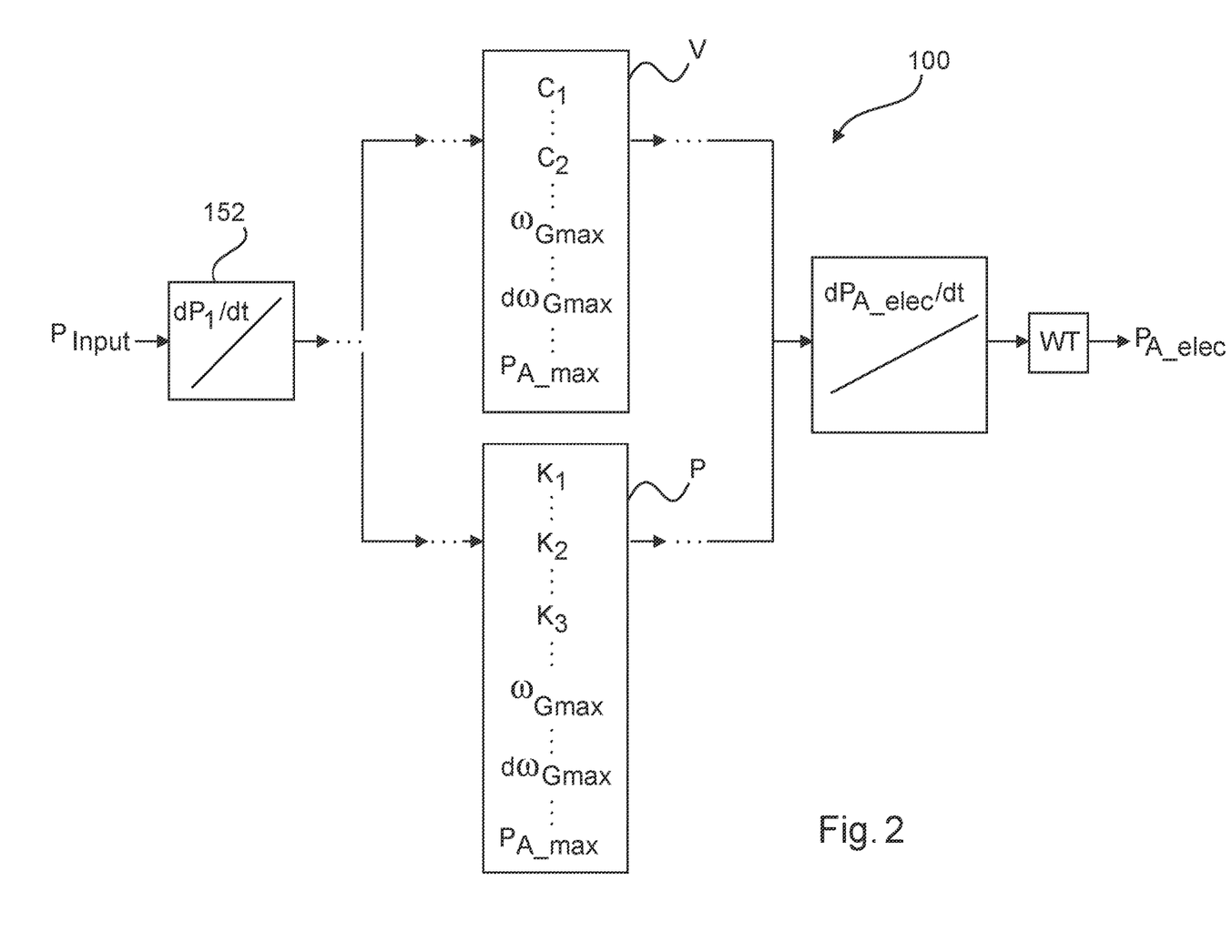
FIG. 2 shows schematically a power control of a wind power installation.

FIG. 2 shows schematically a power control 150 of a wind power installation.

The power control 150 is part of the installation control of the wind power installation and comprises a power input signal $P_{Input}$ which is converted by the power control 150 by means of a gradient control 152 into a first power gradient $dP_1/dt$.

This power gradient $dP_1/dt$ created in this way is converted by means of a stabilization operator V or a prediction operator P into an electrical power gradient $dP_{A\_elec}/dt$ which is preferably flatter than the power gradient $dP_1/dt$.

The electrical power gradient $dP_{A\_elec}/dt$ is then fed to an inverter or to a power control of the wind power installation WT in order to generate an electrical power $P_{A\_elec}$ by means of the wind power installation depending on the created electrical power gradient $dP_{A\_elec}/dt$ for a feed-in time period with a feed-in time.

For this purpose, the stabilization operator V comprises at least, for example, a stabilization constant $c_1$ which is less than 1, in particular such that the electrical power gradient $dP_{A\_elec}/dt$ is smaller than the wind power gradient $dP_W/dt$, and furthermore or alternatively a prediction constant $c_2$ which is between 0.4 and 0.6, preferably 0.5, in particular such that the electrical power gradient $dP_{A\_elec}/dt$ is smaller than the wind power gradient $dPw/dt$ and/or the power gradient $dP_1/dt$, and furthermore or alternatively a power gradient for a maximum electrical power $P_{A\_max}$ of the wind power installation which is less than a maximum wind power which has been predicted by means of the at least one monitored wind parameter, and furthermore or alternatively a rotational speed limit value of a maximum permissible rotational speed change $d\omega_{G\_max}$ of the generator and/or a maximum permissible rotational speed $\omega_{G\_max}$ of the generator.

For this purpose, the prediction operator P comprises at least, for example, a prediction constant $k_1$ which is less than 1, in particular such that the electrical power gradient $dP_{A\_elec}/dt$ is smaller than the wind power gradient $dP_W/dt$, and furthermore or alternatively a prediction constant $k_2$ which is between 0.4 and 0.6, preferably 0.5, in particular such that the electrical power gradient $dP_{A\_elec}/dt$ is smaller than the wind power gradient $dP_W/dt$, and furthermore or alternatively a prediction constant $k_3$ which is chosen in such a way that the electrical power gradient $dP_{A\_elec}/dt$ generates an electrical wind power installation activity beginning with the start of the feed-in time period with the start feed-in time and ending with the end of the feed-in time period with the end feed-in time which essentially corresponds in terms of amount to a wind activity beginning with the start of the prediction time period with the start prediction time and ending with the end of the feed-in time period with the end feed-in time, and furthermore or alternatively a power limit value for a maximum electrical power $P_{A\_max}$ of the wind power installation which is less than the maximum wind power which has been predicted by means of the at least one monitored wind parameter, and furthermore or alternatively a rotational speed limit value of a maximum permissible rotational speed change $d\omega_{G\_max}$ of the generator and/or a maximum permissible rotational speed $\omega_{G\_}$max of the generator.

The power control is therefore configured to perform a gradient limitation with power limitation as described above or below by means of the stabilization operator V, in particular utilizing reserve power and mass inertia of the rotor.

The power control is therefore also further configured to perform a gradient limitation described above or below with precontrol by means of the prediction operator P, in particular by means of LIDAR and utilizing the mass inertia of the rotor, in particular the rotor-generator system.

In one particularly preferred embodiment, the power control of the wind power installation is configured to switch between a first operating mode with the stabilization operator V and a second operating mode with the prediction operator P.

The power control therefore has two operating modes between which it is possible to switch, in particular according to requirements and/or in response to a signal of a network operator, or if the LIDAR signal is not available, for example due to fog or air that is too pure.

Figure 3:
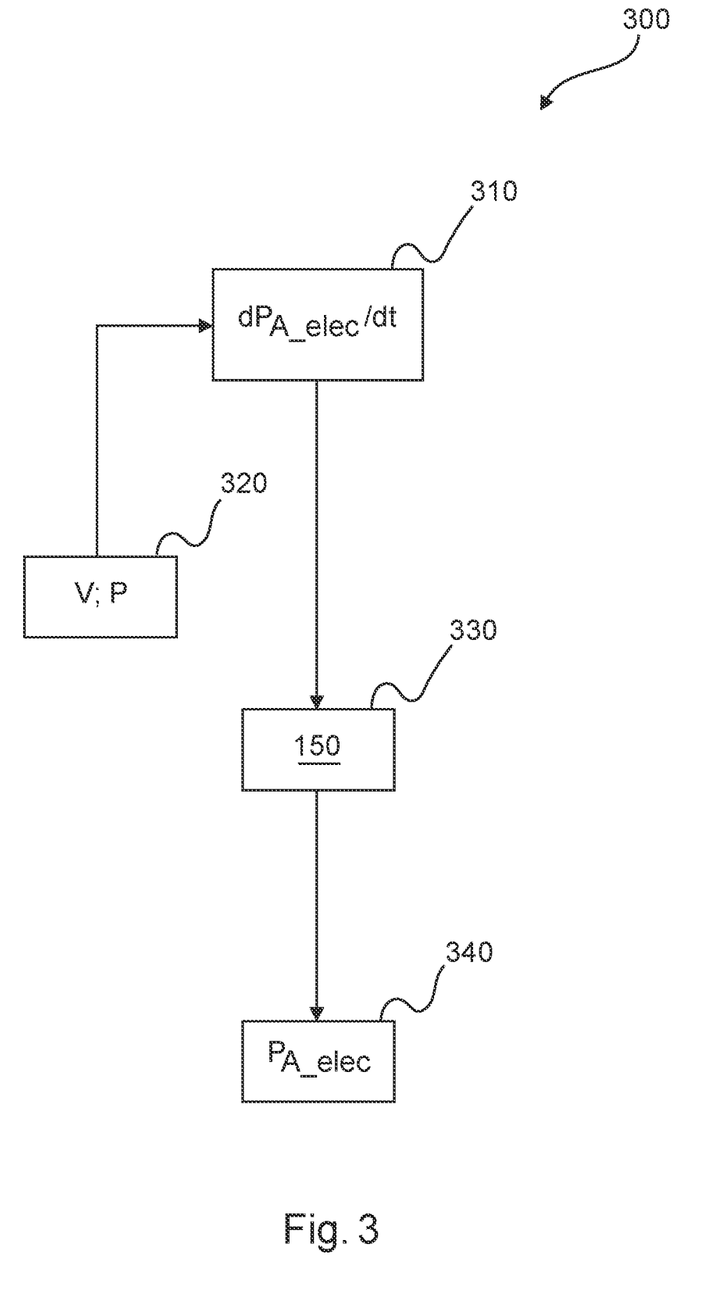
FIG. 3 shows schematically the sequence of a method in a block diagram.

FIG. 3 shows schematically the sequence of a method in a block diagram 300.

The method for feeding electrical power into an electrical supply network by means of at least one wind power installation having a power control and a generator first comprises the step of: creating an electrical power gradient $dP_{A\_elec}/dt$ for an electrical power $P_{A\_elec}$ to be generated by the wind power installation. This is indicated by the block 310.

A stabilization operator V described above or below and/or a prediction operator P described above or below is/are used for this purpose. This is indicated by the block 320.

The creation of the electrical power gradient $dP_{A\_elec}/dt$ is described, in particular, in FIG. 2.

The electrical power gradient $dP_{A\_elec}/dt$ is then adjusted in the power control 150 of the wind power installation. This is indicated by the block 330.

An electrical power $P_{A\_elec}$ is then generated by means of the wind power installation depending on the created electrical power gradient $dP_{A\_elec}/dt$ for a feed-in time period with a feed-in time. This is indicated by the block 340.

Figure 4:
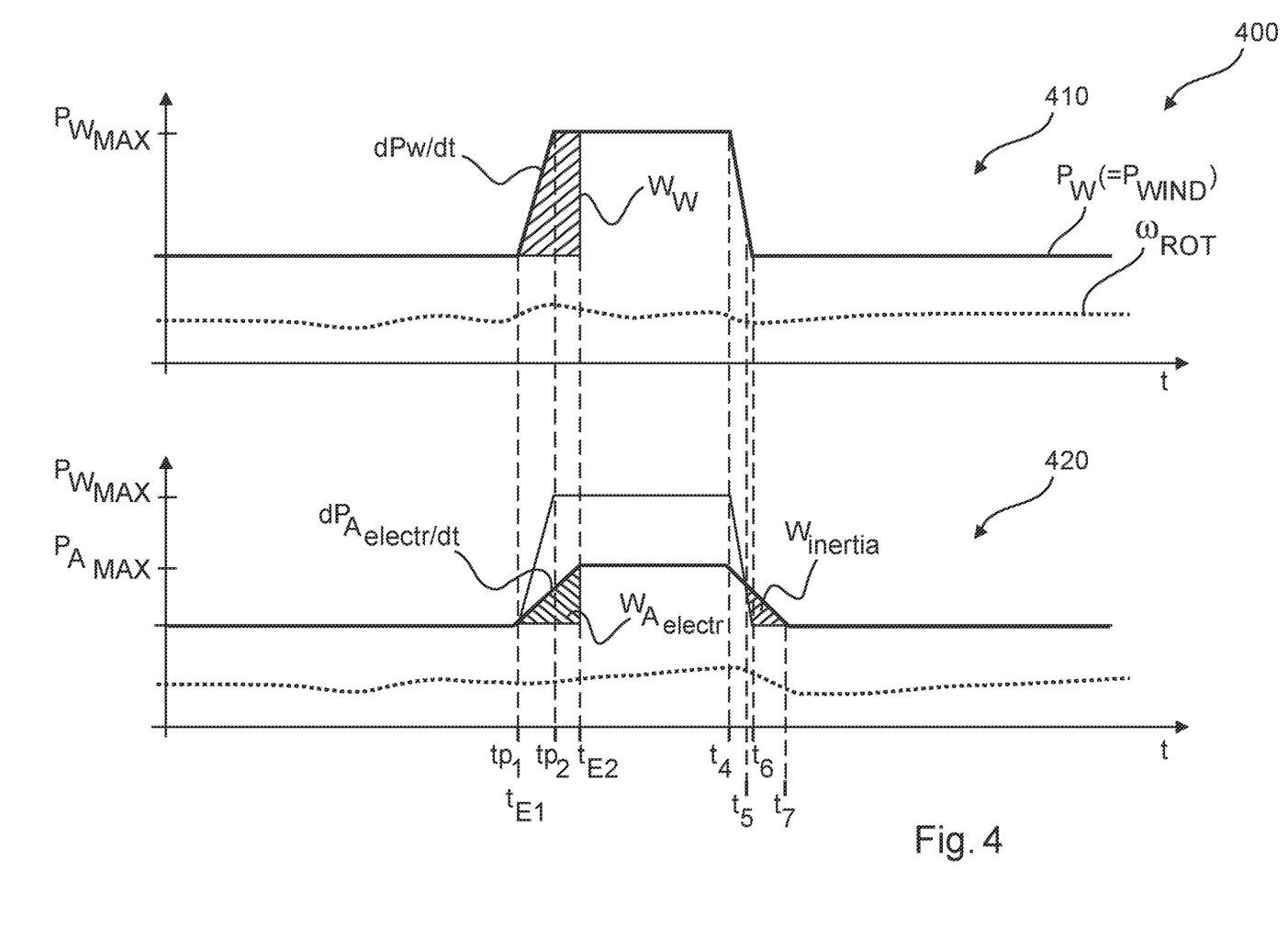
FIG. 4 shows schematically the sequence of a preferred method.

FIG. 4 shows schematically the sequence of a preferred method 400, in particular a gradient limitation with power limitation, preferably utilizing a reserve power and mass inertia of the rotor-generator system.

The development of the wind $P_W$ is mapped in the upper diagram 410, said wind having a (predicted) wind power gradient $dP_W/dt$ which results in a rotational speed $\omega_{ROT}$ of the wind power installation.

If a wind gust develops, i.e., if, for example, the wind changes at the time $t_{p1}$, this produces a wind power gradient $dP_W/dt$ which changes the rotational speed $\omega_{ROT}$ of the wind power installation. This is shown in the upper diagram 410.

In the lower diagram 420, the electrical power gradient $dP_{A\_elec}/dt$ is then limited by means of a stabilization operator, in particular such that the electrical power gradient $dP_{A\_elec}/dt$ is smaller than the wind power gradient $dP_W/dt$.

The power limitation results in an electrical wind power installation activity $W_{A\_elec}$ which is less than a wind activity $W_W$ which the prevailing wind makes available.

If the wind gust dies down at a later time t4, a flatter power gradient is similarly used which is, in particular, smaller than a power gradient of the prevailing wind. This can have the result that the wind power installation has to generate more electrical power in a time period [t5; t7] than is obtainable from the prevailing wind. This power deficit is preferably provided by means of a withdrawal $W_{inertia}$ from the rotor-generator system.

The wind power installation can be operated particularly sparingly on the electrical supply network by means of the stabilization. It is ensured by means of the power limitation that the rotor energy is sufficient to enable a gradient limitation in a negative direction.

Figure 5:
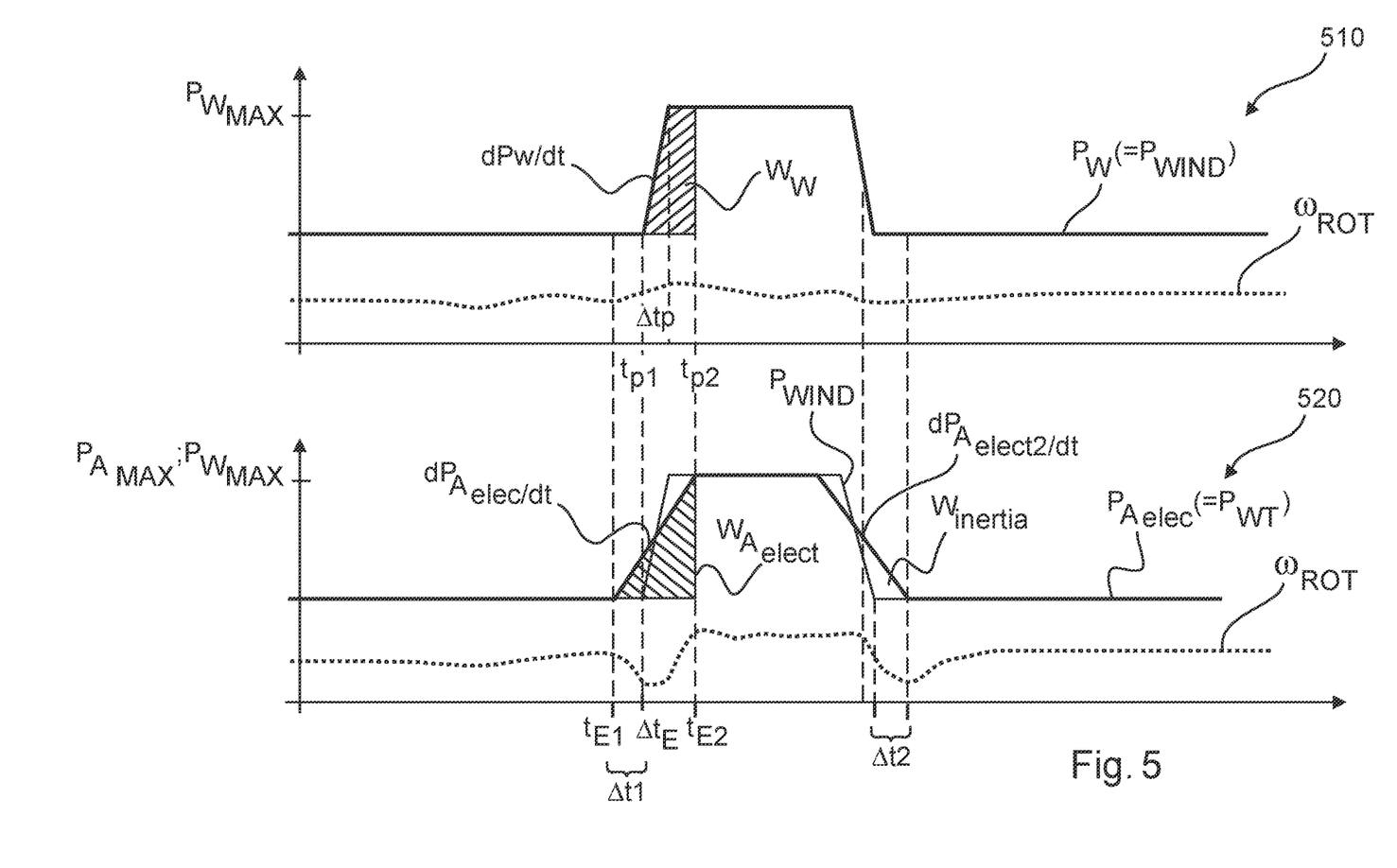
FIG. 5 shows schematically the sequence of a particularly preferred method.

FIG. 5 shows schematically the sequence of a particularly preferred method 500, in particular a gradient limitation with precontrol, preferably by means of a LIDAR system and utilization of the mass inertia of the rotor.

The development of the wind $P_W$ is mapped in the upper diagram 510, said wind having a (predicted) wind power gradient $dP_W/dt$ which results in a rotational speed $\omega_{ROT}$ of the wind power installation.

If a wind gust develops, i.e., if, for example, the wind changes at the time $t_{p1}$, this produces a wind power gradient $dP_W/dt$ which changes the rotational speed $\omega_{ROT}$ of the wind power installation. This is shown in the upper diagram 510.

In the lower diagram 520, the electrical power gradient $dP_{A\_elec}/dt$ is now limited by means of a prediction operator in such a way that the electrical power gradient $dP_{A\_elec}/dt$ is unequal to a predicted wind power gradient $dP_W/dt$.

The prediction operator P is chosen in such a way that the feed-in time period with the feed-in time $\Delta t_E$ begins with a time shift $\Delta t1$ before the prediction time period with the prediction time $\Delta t_P$.

The gradient limitation therefore results in an electrical wind power installation activity $W_{A\_elec}$ which is essentially equal to the wind activity $W_W$ which the prevailing wind makes available.

It is therefore proposed, in particular, to begin the feed-in of electrical power before the development of the wind gust in order to stabilize the feed-in of the wind power installation. In cases where the wind power installation generates more electrical power than is obtainable from the prevailing wind, energy is extracted mechanically from the wind power installation by changing the rotational speed of the generator, i.e., mechanical activity $W_{inertia}$ is provided by means of the rotor-generator system.

According to FIG. 5, the power control therefore comprises a precontrol which is achieved by means of a prediction operator which takes account of developing wind conditions.

The wind power installation can be operated particularly sparingly on the electrical supply network by means of the stabilization.

Figure 6:
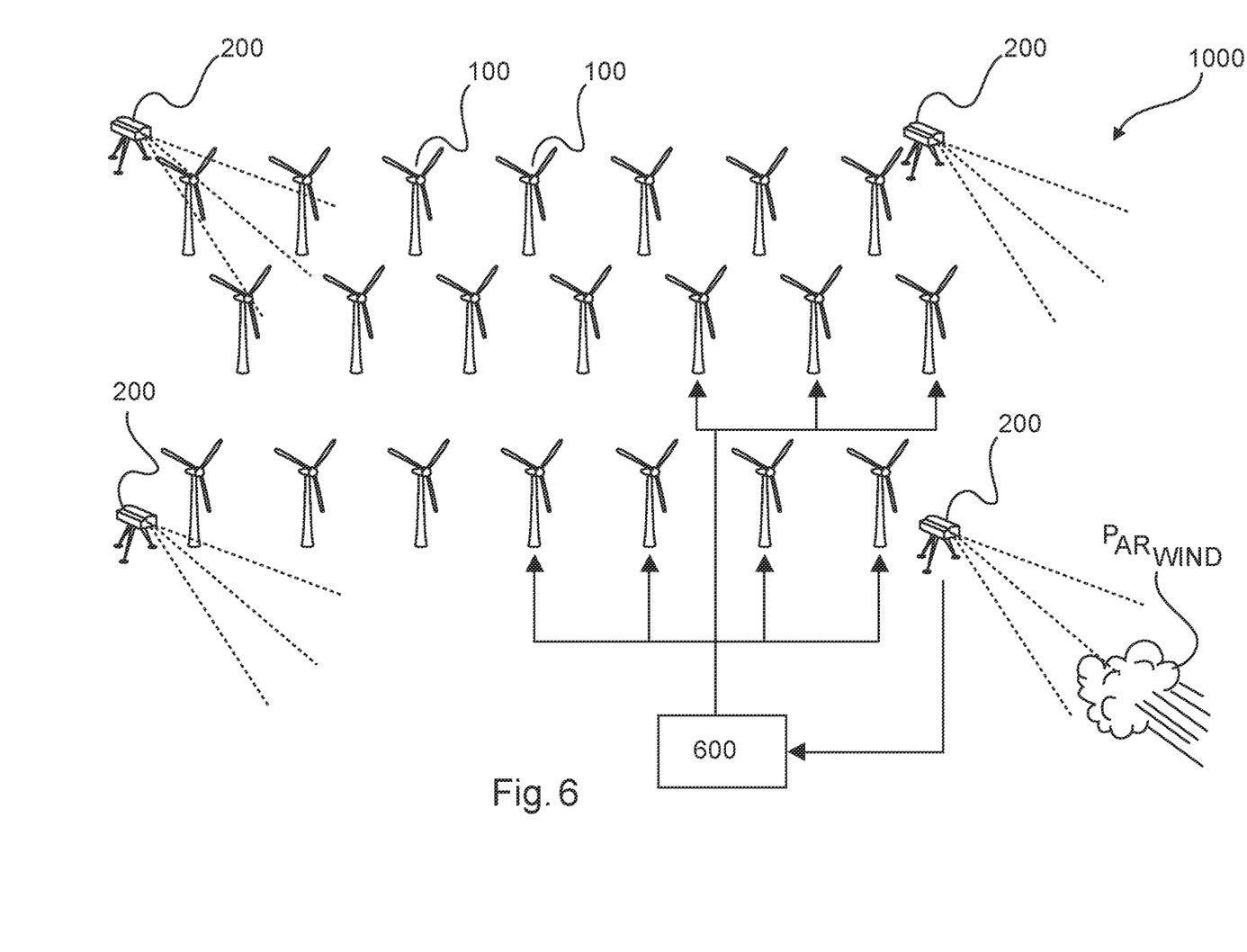
FIG. 6 shows schematically a wind farm.

FIG. 6 shows schematically a wind farm 1000, comprising a plurality of wind power installations 100 and a wind farm control 600 which is configured to carry out a method described above or below, in particular using a LIDAR system 200.

For this purpose, the LIDAR system 200 preferably comprises a wind parameter Par$_{Wind}$, preferably the wind speed, in order to control the individual wind power installations as above or below depending on this parameter in such a way that the feed-in of the wind power installation 100 or the windfarm 1000 is stabilized.

According to FIG. 6, a power control with a precontrol is similarly proposed which is achieved by means of a prediction operator which takes account, in particular, of the developing wind conditions.

The wind farm control 600 or wind farm control unit (controller) 600 is thus preferably configured to limit the power gradients of the individual wind power installations in such a way that the output power of the wind farm is limited. For this purpose, the same power gradient can be predefined, for example, for each wind power installation, or an individual power gradient which behaves in relation to the rated power of the installation can be predefined for each wind power installation. The latter option is particularly advantageous in relation to mixed farms, i.e., farms which have a multiplicity of wind power installations which are of different types and have different rated powers.

The invention claimed is:

1. A method for feeding electrical power into an electrical supply network using at least one wind power installation including a power controller and a generator, comprising:
   determining an electrical power gradient for the electrical power to be generated by the at least one wind power installation, wherein the electrical power gradient is at least: limited using a stabilization operator; or determined, using a prediction operator, to be unequal to a predicted wind power gradient;
   adjusting the electrical power gradient in the power controller of the at least one wind power installation; and
   generating the electrical power using the at least one wind power installation depending on the electrical power gradient for a feed-in time period having a feed-in time duration.

2. The method as claimed in claim 1, comprising:
   determining, based on at least one monitored wind parameter, the predicted wind power gradient for a future prevailing wind in a rotor field of the at least one wind power installation for a prediction time period having a prediction time duration.

3. The method as claimed in claim 2, wherein the stabilization operator includes at least one of:
   a stabilization constant that is less than 1, such that the electrical power gradient is less than the predicted wind power gradient;
   the stabilization constant that is between 0.4 and 0.6 that the electrical power gradient is less than the predicted wind power gradient;
   a power limit value for a maximum electrical power of the at least one wind power installation that is less than a maximum wind power predicted using the at least one monitored wind parameter; and
   a rotational speed limit value for a maximum permissible rotational speed change of the generator and/or a maximum permissible rotational speed of the generator.

4. The method as claimed in claim 3, wherein the prediction operator and/or the stabilization operator are selected such that an end of the feed-in time period is time-shifted after an end of the prediction time period.

5. The method as claimed in claim 3, wherein the prediction operator and/or the stabilization operator are selected such that: the generated electrical power is less than the maximum wind power that is predicted using the at least one monitored wind parameter, or the generated electrical power is less than a maximum energy obtainable from a rotor of the at least one wind power installation.

6. The method as claimed in claim 2, wherein the prediction operator includes at least one of:
   a prediction constant that is less than 1, such that the electrical power gradient is less than the predicted wind power gradient;
   the prediction constant that is between 0.4 and 0.6 such that the electrical power gradient is less than the predicted wind power gradient;
   the prediction constant is selected such that the electrical power gradient results in generating an electrical wind power installation activity beginning at a start of the feed-in time period and ending at the end of the feed-in time period corresponding to a wind activity beginning at a start of the prediction time period and ending at an end of the feed-in time period;
   a power limit value for a maximum electrical power of the at least one wind power installation that is less than a maximum wind power that is predicted using the at least one monitored wind parameter; and
   a rotational speed limit value for a maximum permissible rotational speed change of the generator and/or a maximum permissible rotational speed of the generator.

7. The method as claimed in claim 2, wherein the prediction operator is selected such that a beginning of the feed-in time period is time-shifted before a beginning of the prediction time period.

8. The method as claimed in claim 2, wherein:
   the prediction time duration is not equal to the feed-in time duration,
   the prediction time duration is less than the feed-in time duration, or
   the prediction time duration is less than half of the feed-in time duration.

9. The method as claimed in claim 2, wherein:
   the feed-in time period begins before the prediction time period, and
   the electrical power is generated, based on the electrical power gradient for the feed-in time period, before the prediction time period.

10. The method as claimed in claim 1, comprising:
    generating the electrical power using wind power moving through a rotor field of the at least one wind power installation; and
    mechanically extracting stored, mechanical power from the at least one wind power installation by changing a rotational speed of the generator.

11. The method as claimed in claim 1, wherein the predicted wind power gradient is predicted using a LIDAR system.

12. The method as claimed in claim 11, wherein the LIDAR system is aimed at a sector having a median line substantially perpendicular to a rotor field of the at least one wind power installation or on a normal of prevailing wind.

13. The method as claimed in claim 1, wherein the electrical power gradient is limited using precontrol of the power controller and/or a gradient limiter.

14. The method as claimed in claim 1, wherein feeding the electrical power into the electrical supply network is performed using a mass inertia of the generator.

15. A wind power installation, comprising:
a power controller configured to:
- determine an electrical power gradient for an electrical power to be generated by the wind power installation, wherein the electrical power gradient is at least: limited using a stabilization operator; or determined, using a prediction operator, to be unequal to a predicted wind power gradient;
- adjust the electrical power gradient in the power controller of the wind power installation; and
- cause the electrical power to be generated using the wind power installation depending on the electrical power gradient for a feed-in time period having a feed-in time duration.

16. A wind farm, comprising:
a plurality of wind power installations including the wind power installation as claimed in claim 15;
a wind farm controller; and
a LIDAR system.

17. A method for generating an electrical current, comprising:
- determining an electrical power gradient for an electrical power to be generated by at least one wind power installation, wherein the electrical power gradient is at least: limited using a stabilization operator; or determined, using a prediction operator, to be unequal to a predicted wind power gradient;
- repeatedly adjusting the electrical power gradient in a power controller of the at least one wind power installation, wherein an adjusted power gradient has an opposite sign and the same magnitude as a power gradient prior to adjustment; and
- generating the electrical power using the at least one wind power installation depending on the electrical power gradient for a feed-in time period having a feed-in time duration.

* * * * *